US010627072B2

(12) United States Patent
Dziurda et al.

(10) Patent No.: US 10,627,072 B2
(45) Date of Patent: Apr. 21, 2020

(54) LIGHTING SYSTEM FOR A MOTOR VEHICLE WITH ACTIVE AERODYNAMIC ELEMENT

(71) Applicant: GM GLOBAL TECHNOLOGY OPERATIONS LLC, Detroit, MI (US)

(72) Inventors: Robert A. Dziurda, Waterford, MI (US); Anthony A. Bosco, Macomb, MI (US); Jake T. Krapes, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 378 days.

(21) Appl. No.: 15/475,728

(22) Filed: Mar. 31, 2017

(65) Prior Publication Data

US 2018/0281669 A1    Oct. 4, 2018

(51) Int. Cl.
*B62D 35/00* (2006.01)
*F21S 43/33* (2018.01)
(Continued)

(52) U.S. Cl.
CPC ............ *F21S 43/33* (2018.01); *B60Q 1/0035* (2013.01); *B60Q 1/302* (2013.01); *B62D 35/007* (2013.01);
(Continued)

(58) Field of Classification Search
CPC .... B62D 37/02; B62D 35/005; B62D 35/007; B62D 35/008; B60Q 1/44; B60Q 1/0005; B60Q 1/2696; B60Q 1/302; B60Q 1/2661; F21S 43/31; F21S 43/15; F21S 43/14; F21S 43/33; Y02T 10/88; F21W 2103/35
(Continued)

(56) References Cited

U.S. PATENT DOCUMENTS 4,773,692 A * 9/1988 Schleicher ........... B62D 35/007
296/180.5
5,165,751 A * 11/1992 Matsumoto .......... B62D 35/007
296/180.5
(Continued)

FOREIGN PATENT DOCUMENTS

JP        08192776 A   *  7/1996  ............. B62D 37/02
JP     2001063458 A   *  3/2001  ............. B60Q 1/44
KR     2015004587 U   * 12/2015  ............. B62D 37/02

*Primary Examiner* — Bao Q Truong
*Assistant Examiner* — Fatima N Farokhrooz
(74) *Attorney, Agent, or Firm* — Quinn IP Law

(57) ABSTRACT

A lighting system is employed in a motor vehicle that includes a vehicle body arranged along a longitudinal axis and having a first vehicle body end configured to face oncoming ambient airflow when the vehicle is in motion relative to a road surface. The vehicle also includes a second vehicle body end opposing the first vehicle body end, and an aerodynamic-element having an aerodynamic-element body mounted to the second vehicle body end and arranged perpendicular to the longitudinal axis. The lighting system includes a light source mounted to the vehicle body and configured to direct at least one beam of light at the aerodynamic-element body. The lighting system also includes a light-reflecting feature arranged on the aerodynamic-element body and having an orientation configured to reflect the at least one beam of light along the longitudinal axis in a direction away from the first vehicle body end.

14 Claims, 5 Drawing Sheets

(51) Int. Cl.
  *B62D 37/02* (2006.01)
  *F21S 43/15* (2018.01)
  *F21S 43/31* (2018.01)
  *F21S 43/14* (2018.01)
  *B60Q 1/00* (2006.01)
  *B60Q 1/30* (2006.01)
  *F21W 103/35* (2018.01)
  *B60Q 1/26* (2006.01)

(52) U.S. Cl.
  CPC .............. *B62D 37/02* (2013.01); *F21S 43/14* (2018.01); *F21S 43/15* (2018.01); *F21S 43/31* (2018.01); *B60Q 1/2661* (2013.01); *F21W 2103/35* (2018.01); *Y02T 10/88* (2013.01)

(58) Field of Classification Search
  USPC ...................................................... 296/180.5
  See application file for complete search history.

(56) References Cited

U.S. PATENT DOCUMENTS

| | | | |
|---|---|---|---|
| 6,170,904 B1* | 1/2001 | Schaedlich | B62D 35/007 296/180.1 |
| 9,126,641 B1* | 9/2015 | Sato | B62D 35/007 |
| 2006/0208519 A1* | 9/2006 | King | B60P 3/40 296/57.1 |
| 2007/0145776 A1* | 6/2007 | Grave | B62D 35/007 296/180.5 |
| 2007/0184284 A1* | 8/2007 | Varaprasad | B32B 17/06 428/426 |
| 2008/0036582 A1* | 2/2008 | Farley | B60Q 1/2615 340/468 |
| 2016/0159412 A1* | 6/2016 | Oxley | B62D 35/007 296/180.5 |
| 2016/0207444 A1* | 7/2016 | Tatara | B60R 11/04 |

* cited by examiner

LIGHTING SYSTEM FOR A MOTOR VEHICLE WITH ACTIVE AERODYNAMIC ELEMENT

INTRODUCTION

The disclosure relates to a lighting system for a motor vehicle employing an active aerodynamic element.

Automotive aerodynamics is the study of aerodynamics of road vehicles. The main goals of the study are reducing drag and wind noise, minimizing noise emission, and preventing undesired lift forces and other causes of aerodynamic instability at high speeds. Additionally, the study of aerodynamics may also be used to achieve downforce in high-performance vehicles in order to improve vehicle traction, high speed stability, and cornering. The study is typically used to shape vehicle bodywork along with employing dedicated aerodynamic devices or elements for achieving a desired compromise among the above characteristics for specific vehicle use.

A spoiler is an automotive aerodynamic device intended to "spoil" unfavorable air movement across a body of a vehicle in motion, usually described as turbulence or drag. Spoilers may be fitted at the front and/or at the rear of the vehicle body. Spoilers on the front of a vehicle are often called air dams. When the vehicle is in motion, in addition to directing air flow, such air dams also reduce the amount of air flowing underneath the vehicle which generally reduces aerodynamic lift and drag.

Additionally, when the vehicle is in motion, the flow of air at the rear of the vehicle becomes turbulent and a low-pressure zone is created, increasing drag and instability. Adding an active aerodynamic element, such as a spoiler, at the rear of the vehicle body may help to delay flow separation from the body and a higher pressure zone created in front of the spoiler may help reduce lift on the vehicle body by creating a desired magnitude of downforce depending on the road speed of the vehicle. As a result, in certain positions relative to the vehicle body, such an active aerodynamic element may reduce aerodynamic drag and increase high speed stability of the vehicle due to the reduced rear lift.

SUMMARY

A lighting system is employed in a motor vehicle that includes a vehicle body arranged along a longitudinal axis and having a first vehicle body end configured to face oncoming ambient airflow when the vehicle is in motion relative to a road surface. The vehicle also includes a second vehicle body end opposing the first vehicle body end, and an aerodynamic-element having an aerodynamic-element body mounted to the second vehicle body end and arranged perpendicular to the longitudinal axis. The lighting system includes a light source mounted to the vehicle body and configured to direct at least one beam of light at the aerodynamic-element body. The lighting system also includes a light-reflecting feature arranged on the aerodynamic-element body and having an orientation configured to reflect the at least one beam of light along the longitudinal axis in a direction away from the first vehicle body end.

The aerodynamic-element may, for example, be configured as an adjustable position rear wing or spoiler. The aerodynamic-element body may be movably mounted to the second vehicle body end. The aerodynamic-element system may additionally include a mechanism configured to vary a position of the aerodynamic-element body relative to the second vehicle body end to thereby control a movement of the ambient airflow relative to the vehicle body.

The mechanism may be configured to selectively retract the aerodynamic-element body out of the ambient airflow and into a position proximate the vehicle body to thereby decrease a downforce acting on the second vehicle body end and deploy or extend the aerodynamic-element body into a position in the ambient airflow to thereby increase the downforce acting on the second vehicle body end. In such an embodiment, the mechanism may be configured to maintain the orientation of the light-reflecting feature to reflect the at least one beam of light along the longitudinal axis between and including the position of the aerodynamic-element body proximate the vehicle body and the position of the aerodynamic-element body deployed into the ambient airflow.

The light source may be centered relative to the longitudinal axis, such that the light-reflecting feature is configured to define a Center High Mount Stop Lamp (CHMSL).

The vehicle may additionally include first and second lateral body sides spanning a distance between the first and second vehicle body ends. In such a vehicle, the light source may include a first-side light source positioned proximate the first lateral body side and configured to direct a first-side beam of light and a second-side light source positioned proximate the second lateral body side and configured to direct a second-side beam of light. Accordingly, in such an embodiment, the light-reflecting feature may be configured to reflect the first-side and second-side beams of light and thereby define at least one of vehicle taillights and vehicle turn signals.

The light-reflecting feature may be one of a polymer and a glass reflector mounted to the aerodynamic-element body.

Alternatively, the light-reflecting feature may be a reflective coating applied to the aerodynamic-element body.

The light source may be an assembly having a lens defined by an external shape configured to diminish accumulation of and shed fluid and grime.

The lens may include a hydrophobic coating configured to further diminish accumulation of fluid and grime.

The light source may include a light emitting diode (LED) and/or a light string.

A motor vehicle having such a lighting system is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
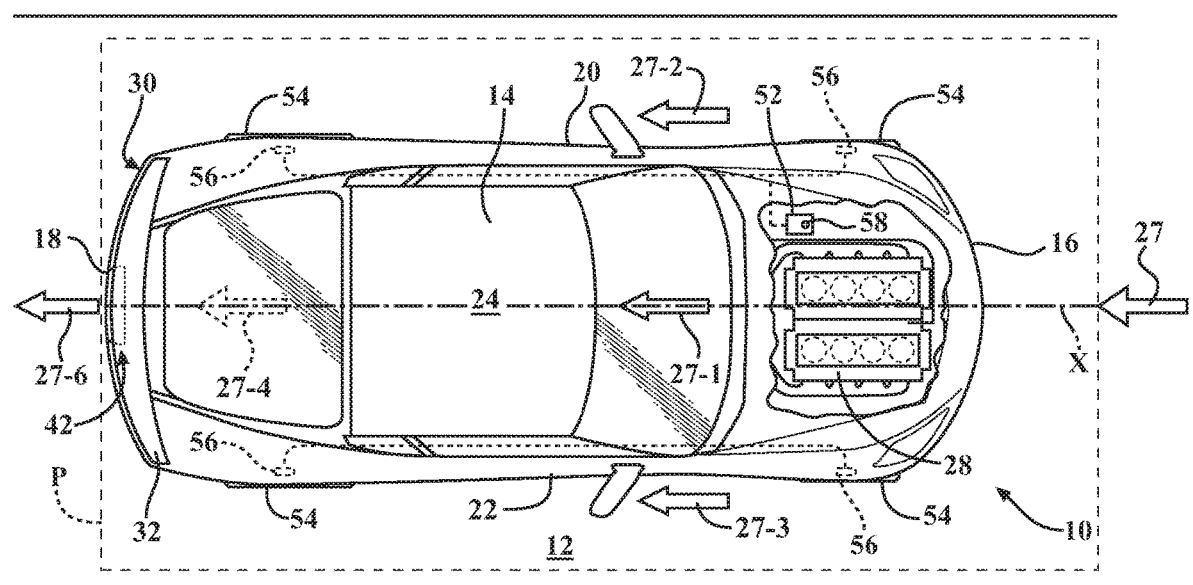
FIG. 1 is a schematic top view of a vehicle having vehicle body arranged in a body plane and along a longitudinal axis, and having an adjustable aerodynamic-element arranged at the rear end of the vehicle and a lighting system according to the disclosure.

Referring to the drawings, wherein like reference numbers refer to like components, FIG. 1 shows a schematic view of a motor vehicle 10 positioned relative to a road surface 12. The vehicle 10 includes a vehicle body 14 arranged along a virtual longitudinal axis X in a body plane P that is substantially parallel to the road surface 12. The vehicle body 14 defines six body sides. The six body sides include a first body end or front end 16, an opposing second body end or rear end 18, a first lateral body side or left side 20, and a second lateral body side or right side 22, a top body portion 24, which may include a vehicle roof, and an underbody portion (not shown).

The left side 20 and right side 22 are disposed generally parallel to each other and with respect to the longitudinal axis X, and span the distance between the front end 16 and the rear end 18. The body plane P is defined to include the longitudinal axis X. A passenger compartment (not shown) of the vehicle 10 is generally bounded by the front and rear ends 16, 18 and the left and right sides 20, 22 of the body 14. The front end 16 is configured to face an oncoming ambient airflow 27 when the vehicle 10 is in motion relative to the road surface 12. When the vehicle 10 is in motion, the oncoming ambient airflow 27 moves substantially parallel to the body plane P and along the longitudinal axis X.

As shown, the vehicle 10 also includes a powerplant 28, such as an internal combustion engine, a hybrid-electric powertrain (not shown), or other alternative types of propulsion systems. As the vehicle 10 moves relative to the road surface 12, for example under torque input from the powerplant 28, the ambient airflow 27 passes around the vehicle body 14 and splits into respective first airflow portion 27-1, second airflow portion 27-2, third airflow portion 27-3, and fourth airflow portion 27-4, that eventually rejoin in a wake area or recirculating airflow region 27-6 immediately behind the rear end 18. Specifically, as shown in FIG. 1, the first airflow portion 27-1 passes over the top body portion 24, the second airflow portion 27-2 passes over the left side 20, the third airflow portion 27-3 passes over the right side 22, and the fourth airflow portion 27-4 (shown in phantom) passes under the vehicle body 14, between the underbody portion and the road surface 12. The recirculating airflow region 27-6 is generally caused at elevated vehicle speeds by the flow of surrounding air around the six body sides of the vehicle body 14.

Figure 2:
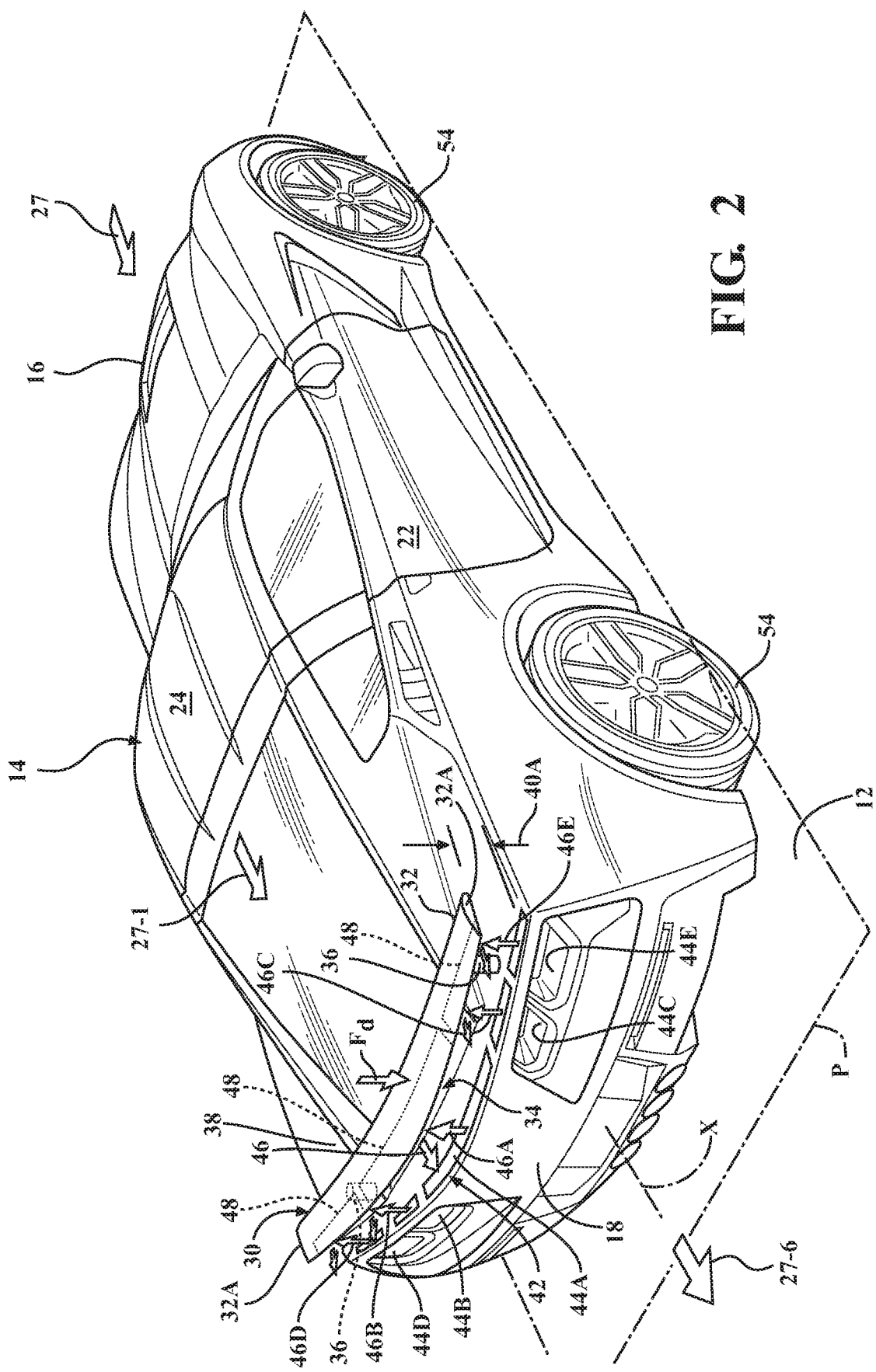
FIG. 2 is a schematic perspective rear view of the vehicle having the light system, shown in FIG. 1, including a light source and a light-reflecting feature, illustrated with the aerodynamic-element assembly in a deployed position according to the disclosure.
Figure 3:
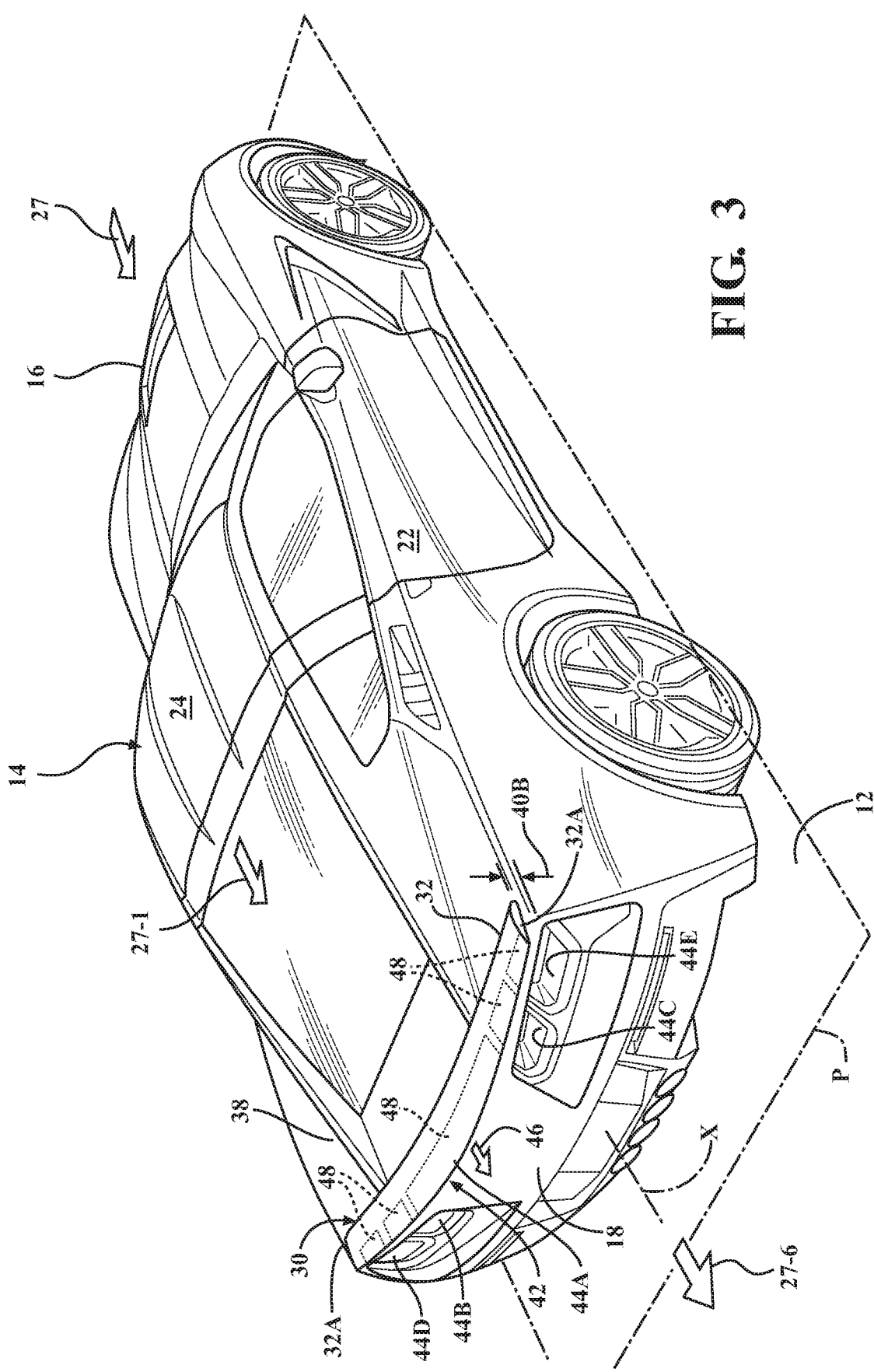
FIG. 3 is a schematic perspective rear view of the vehicle having the light system shown in FIGS. 1 and 2, illustrated with the aerodynamic-element assembly in a retracted position according to the disclosure.

As shown in FIGS. 1-3, the vehicle 10 also includes an aerodynamic-element 30 mounted to the rear end 18. As shown, the aerodynamic-element 30 may be configured as a spoiler. The aerodynamic-element 30 includes an aerodynamic-element body 32 arranged generally perpendicular to the longitudinal axis X. The aerodynamic-element body 32 may be wing-shaped. "Wing-shaped" is herein defined as having a shape of a wing, i.e., a fin having a shape of an airfoil. In a cross-sectional view of the aerodynamic-element body 32 depicted in FIGS. 2 and 3, the subject airfoil is identified via numeral 32A. As shown, the subject airfoil 32A is defined by a streamlined shape producing reverse lift or downforce $F_d$ when the vehicle 10 is in motion and is acted on by the first airflow portion 27-1. Although the disclosure below specifically details a spoiler embodiment of the aerodynamic-element 30, other aerodynamic devices movably mounted to the rear end 18 of the vehicle 10 are also contemplated herein.

As shown in FIGS. 2 and 3, the spoiler assembly 30 also includes a mechanism 34 configured to vary a position of the aerodynamic-element body 32 relative to the rear end 18 to thereby control a movement of the ambient airflow 27 relative to the vehicle body 14. Specifically, the mechanism 34 is configured to selectively deploy or extend the aerodynamic-element body 32 into the first airflow portion 27-1 of the ambient airflow 27 and retract the aerodynamic-element body out of the ambient airflow into a position proximate the vehicle body 14. Deployment of the aerodynamic-element body 32 via the mechanism 34 positions the aerodynamic-element body into a plane P' (shown in FIGS. 4 and 5) that is substantially parallel to the body plane P. The mechanism 34 may include one or more actuators 36 configured to vary the position of the aerodynamic-element body 32 relative to the rear end 18. Such an actuator 36 may operate on an electro-mechanical principle, for example an electric motor, or may be hydraulic or mechanical in nature.

As shown in FIGS. 1-3, proximate the rear end 18, the top body portion 24 includes a panel 38. The panel 38 may be configured as a fixed rear deck, a trunk lid, a lift-gate, or a powerplant cover in an embodiment of the vehicle 10 having the powerplant 28 arranged proximate the rear end 18. Accordingly, the mechanism 34 is configured to extend the aerodynamic-element body 32 away from or out of the panel 38 and into a deployed position 40A within the first airflow portion 27-1 just ahead of the rear end 18 to thereby increase the downforce $F_d$ acting on the rear end of the vehicle 10. The mechanism 34 is also configured to retract the aerodynamic-element body 32 out of the first airflow portion 27-1 and into a stowed position 40B against the panel 38 to thereby decrease the downforce $F_d$ acting on the rear end 18 of the vehicle 10.

As also shown in FIGS. 1-5, the vehicle 10 also includes a lighting system 42. The lighting system 42 includes a light source mounted to the rear end 18 at the panel 38, and generally indicated via numeral 44. The lighting system 42 is configured to generate and direct at least one beam of light, generally indicated with numeral 46 in FIGS. 4-5. According to the disclosure, the beam of light 46 is generated at the aerodynamic-element body 32 substantially perpendicular to the longitudinal axis X. The lighting system 42 also includes a light-reflecting feature, generally indicated with numeral 48 in FIGS. 4-5. The light-reflecting feature 48 is arranged on the aerodynamic-element body 32. Furthermore, the light-reflecting feature 48 has an orientation specifically configured to reflect the at least one beam of light 46 along the longitudinal axis X in a direction away from the front end 16, i.e., aft of the rear end 18, toward the recirculating airflow region 27-6. Such reflection of the at least one beam of light 46 is intended to be visible to observers positioned behind the vehicle 10. The mechanism 34 is also configured to articulate the aerodynamic-element body 32 such that the orientation of the light-reflecting feature 48 is maintained to reflect the at least one beam of light 46 along the longitudinal axis X, anywhere between and including the deployed position 40A and the stowed position 40B of the aerodynamic-element body.

As shown in FIGS. 2 and 3, the light source 44 may include an auxiliary brake lamp 44A centered relative to the longitudinal axis X configured to generate an auxiliary brake lamp beam of light 46A. In such an embodiment, the light-reflecting feature 48 is configured to define a Center High Mount Stop Lamp (CHMSL) mounted higher than the vehicle's standard left and right stop lamps 44B, 44C respectively positioned proximate the left and right body sides 20, 22. Generally, the CHMSL is intended to provide a warning to drivers behind the vehicle 10 whose view of the vehicle's left and right stop lamps 44B, 44C is blocked by interceding vehicles. The CHMSL also provides a redundant stop light signal in the event of a malfunction of the stop lamps 44B, 44C. In such an embodiment, the light-reflecting feature 48 is configured to reflect the auxiliary brake lamp beam of light 46A along the longitudinal axis X in a direction aft of the rear end 18, toward the recirculating airflow region 27-6. The CHMSL may employ and produce light by a single central filament bulb, a row or cluster of filament bulbs or Light Emitting Diodes (LEDs), a light string, a laser phosphor element, or a Neon tube.

Additionally, as shown in FIGS. 2-3, the light source 44 may include left and right stop lamps 44B, 44C, which are respectively identified as first-side and second-side light sources. In such an embodiment, the left stop lamp 44B would be configured to direct a first-side beam of light 46B at an appropriately positioned light-reflecting feature 48, and the second-side light source 44C would be configured to direct a second-side beam of light 46C at another appropriately positioned light-reflecting feature 48. Furthermore, the first-side and second-side light sources may be respectively identified as left and right turn signals 44D, 44E. The left and right turn signals 44D, 44E are also positioned proximate the left and right body sides 20, 22, respectively, and are configured to generate respective recurrent or repeating beams of light 46D, 46E. Accordingly, the light source 44 may define vehicle taillights and/or vehicle turn signals.

Similar to the auxiliary brake lamp light source 44A, each of the stop lamps 44B, 44C and turn signals 44D, 44E may employ and produce light by filament bulb(s), row or cluster of filament bulbs or LEDs, light string(s), laser phosphor element(s) or Neon tube(s). As shown in FIGS. 2 and 3, each of the light sources 44A-E may extend over both the vertical and horizontal surfaces of the vehicle body 14. Accordingly, the CHMSL and/or the stop lamps and turn signals may be partially arranged in a plane perpendicular to both the longitudinal axis X and the road surface 12, and partially in a plane parallel to the road surface facing the light-reflecting feature(s) 48.

Figure 4:
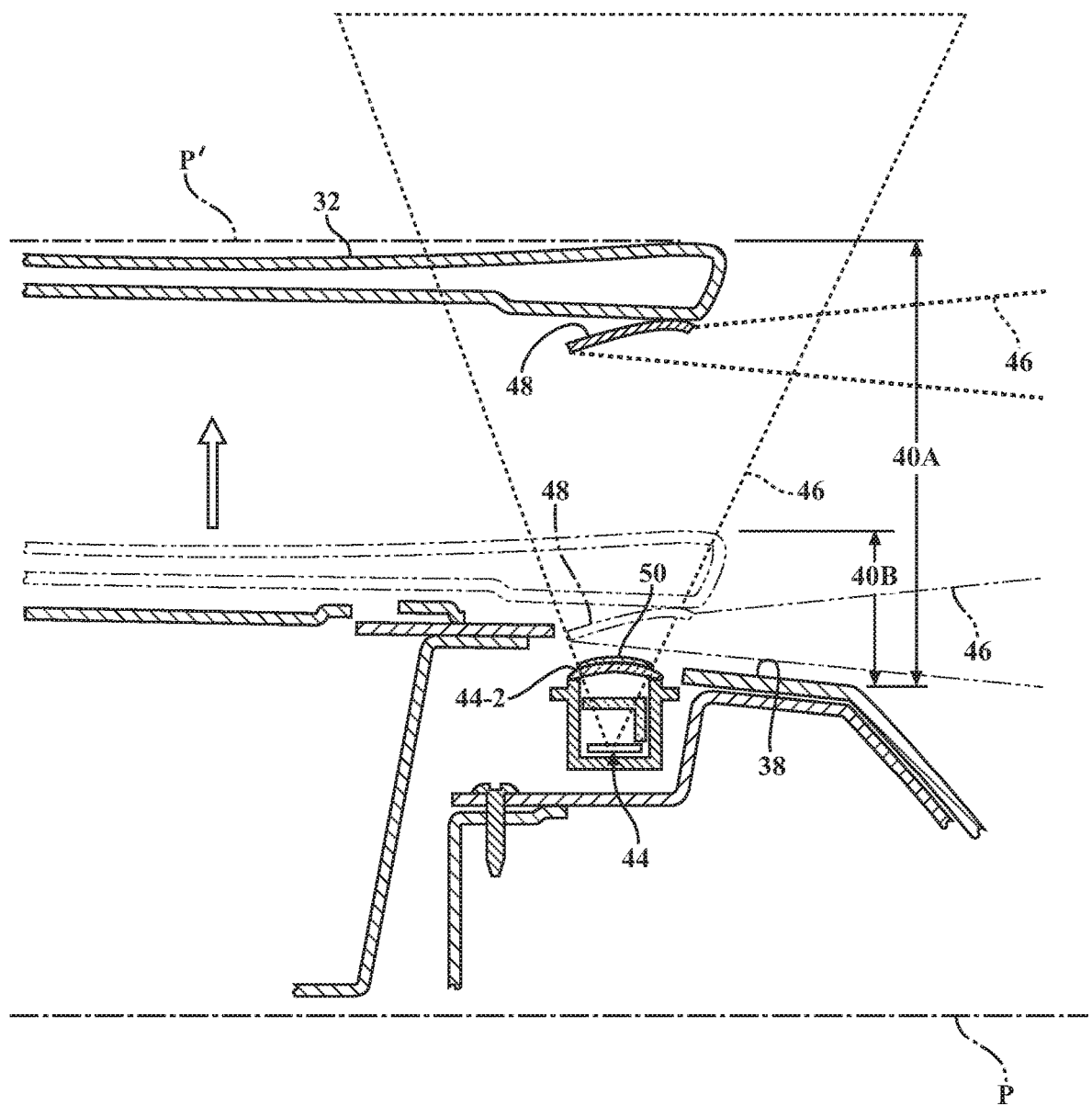
FIG. 4 is a schematic cross-sectional side view of the light system according to one embodiment.
Figure 5:
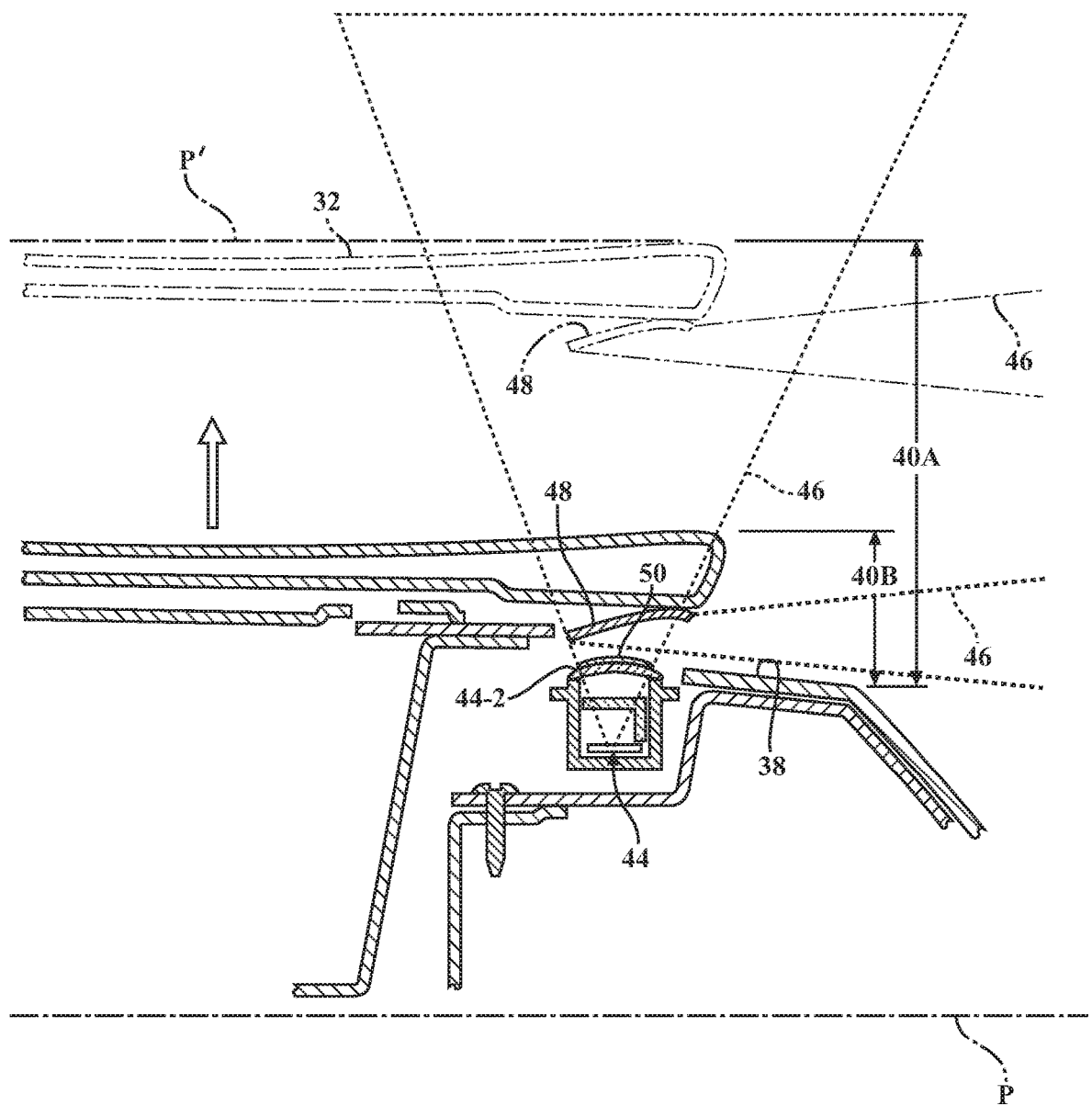
FIG. 5 is a schematic cross-sectional side view of the light system according to another embodiment.

As shown in FIGS. 2 and 3, the light-reflecting feature 48 may be a reflective polymer coating applied to the aerodynamic-element body 32. Alternatively, as shown in FIGS. 4 and 5, the light-reflecting feature 48 may be a reflector constructed or molded from a polymer or a glass and mounted to the aerodynamic-element body 32. The light source 44 may be an assembly having a lens 44-1 defined by an external shape 44-2 configured to diminish accumulation of or shed fluid, such as precipitation or road-borne water, and grime. Specifically, in a cross-sectional view, the external shape 44-2 may have a coned contour (shown in FIG. 4) or a convex contour (shown in FIG. 5). The lens 44-1 may also include an exterior hydrophobic or superhydrophobic coating 50 configured to further diminish accumulation of or shed fluid and grime, as shown in FIG. 5.

Generally, a superhydrophobic coating is a nanoscopic surface layer that repels water. Fluid droplets coming into contact with such a coating may fully rebound. A superhydrophobic coating 50 may, for example, be formulated from materials based on manganese oxide polystyrene ($MnO_2$/PS) nano-composite, zinc oxide polystyrene (ZnO/PS) nano-composite, precipitated calcium carbonate, a carbon nanotube structure, or silica nano-coating. Additionally, the lens 44-1 may be arranged at an angle (not shown) relative to the plane P, such that when the vehicle is positioned on a flat road surface 12, the lens is generally sloped or inclined to urge fluid to run off therefrom.

As shown in FIG. 1, the vehicle 10 also includes an electronic controller 52 configured, i.e., constructed and programmed, to regulate the mechanism 34 and thereby vary the position of the aerodynamic-element body 32 relative to the rear end 18 between and including the positions 40A and 40B. The controller 52 may be configured as a central processing unit (CPU) configured to regulate operation of the powerplant 28, as well as other vehicle systems, or a dedicated controller. In order to appropriately control operation of the mechanism 34, the controller 52 includes a memory, at least some of which is tangible and non-transitory. The memory may be a recordable medium that participates in providing computer-readable data or process instructions. Such a medium may take many forms, including but not limited to non-volatile media and volatile media.

Non-volatile media for the controller 52 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 52 may also include a flexible disk, hard disk, magnetic tape, other magnetic medium, a CD-ROM, DVD, other optical medium, etc. The controller 52 may be configured or equipped with other required computer hardware, such as a high-speed clock, requisite Analog-to-Digital (A/D) and/or Digital-to-Analog (D/A) circuitry, input/output circuitry and devices (I/O), as well as appropriate signal conditioning and/or buffer circuitry. Algorithms required by the controller 52 or accessible thereby may be stored in the memory and automatically executed to provide the required functionality.

The vehicle 10 also includes road wheels 54. As shown in FIG. 1, at least one sensor 56 may be arranged on the vehicle body 14 for detecting rotating speeds of each road wheel 54. Each sensor 56 may also be configured to communicate the detected rotating speed of the respective road wheel 54 to the controller 52, while the controller may be configured to correlate the data received from the respective sensors to road speed of the vehicle 10. The controller 52 is configured to then regulate the mechanism 34 to selectively deploy the aerodynamic-element body 32 into the first airflow portion 27-1 of the ambient airflow 27 and retract the aerodynamic-element body out of the first airflow portion in response to the detected rotating speed of the road wheel 54. For example, the controller 52 may be programmed with one or more predetermined thresholds 58 for road speed, above which the controller will command the mechanism 34 to deploy the aerodynamic-element body 32 from the position 40A to the position 40B or to some intermediate position. Throughout the articulated positions of the aerodynamic-element body 32, for example, as dictated by the road speed of the vehicle 10, the lighting system 42 is intended to maintain reflection of the beam(s) of light 46 aft of the rear end 18 and toward the recirculating airflow region 27-6 via the respective light-reflecting feature(s) 48.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A vehicle comprising:
a vehicle body arranged along a longitudinal axis and having a first vehicle body end configured to face oncoming ambient airflow when the vehicle is in motion relative to a road surface, a second vehicle body end opposing the first vehicle body end, and first and second lateral body sides spanning a distance between the first and second vehicle body ends;
an aerodynamic-element having an aerodynamic-element body moveably mounted to the second vehicle body end and arranged perpendicular to the longitudinal axis;
a mechanism configured to vary a position of the aerodynamic-element body relative to the second vehicle body end to thereby control a movement of the ambient airflow relative to the vehicle body; and
a lighting system including:
a light source mounted to the vehicle body and configured to direct at least one beam of light at the aerodynamic-element body; and
a light-reflecting feature arranged on the aerodynamic-element body and having an orientation configured to reflect the at least one beam of light along the longitudinal axis in a direction away from the first vehicle body end;
wherein:
the light source includes a first-side light source positioned proximate the first lateral body side and configured to direct a first-side beam of light and a second-side light source positioned proximate the second lateral body side and configured to direct a second-side beam of light, such that the light-reflecting feature is configured to reflect the first-side and second-side beams of light and thereby define at least one of vehicle taillights and vehicle turn signals; and
the mechanism is configured to selectively retract the aerodynamic-element body out of the ambient airflow and into a position proximate the vehicle body to thereby decrease a downforce acting on the second vehicle body end, to deploy the aerodynamic-element body into a position in the ambient airflow to thereby increase the downforce acting on the second vehicle body end, and to maintain the orientation of the light-reflecting feature to reflect the at least one beam of light along the longitudinal axis between and including the position of the aerodynamic-element body proximate the vehicle body and the position of the aerodynamic-element body deployed into the ambient airflow.

2. The vehicle according to claim 1, wherein the light-reflecting feature is one of a polymer and a glass reflector mounted to the aerodynamic-element body.

3. The vehicle according to claim 1, wherein the light-reflecting feature is a reflective coating applied to the aerodynamic-element body.

4. The vehicle according to claim 1, wherein the light source is an assembly having a lens defined by an external shape configured to diminish accumulation of fluid and grime.

5. The vehicle according to claim 1, wherein the light source includes at least one of a light emitting diode (LED) and a light string.

6. The vehicle according to claim 1, wherein the light source extends over each of a vertical surface and a horizontal surface of the vehicle body, and is thereby arranged partially in a plane perpendicular to the longitudinal axis and partially in a plane parallel to the longitudinal axis facing the light-reflecting feature.

7. The vehicle according to claim 4, wherein the lens includes a hydrophobic coating configured to further diminish accumulation of fluid and grime.

8. A lighting system for a motor vehicle having a vehicle body arranged along a longitudinal axis and having a first vehicle body end configured to face oncoming ambient airflow when the vehicle is in motion relative to a road surface, a second vehicle body end opposing the first vehicle body end, a first and second lateral body sides spanning a distance between the first and second vehicle body ends, an aerodynamic-element having an aerodynamic-element body moveably mounted to the second vehicle body end and arranged perpendicular to the longitudinal axis, and a mechanism configured to vary a position of the aerodynamic-element body relative to the second vehicle body end to thereby control a movement of the ambient airflow relative to the vehicle body, the lighting system comprising:
a light source mounted to the vehicle body and configured to direct at least one beam of light at the aerodynamic-element body; and
a light-reflecting feature arranged on the aerodynamic-element body and having an orientation configured to reflect the at least one beam of light along the longitudinal axis in a direction away from the first vehicle body end;
wherein:
the light source includes a first-side light source positioned proximate the first lateral body side and configured to direct a first-side beam of light and a second-side light source positioned proximate the second lateral body side and configured to direct a second-side beam of light, such that the light-reflecting feature is configured to reflect the first-side and second-side beams of light and thereby define at least one of vehicle taillights and vehicle turn signals; and
the mechanism is configured to selectively retract the aerodynamic-element body out of the ambient airflow and into a position proximate the vehicle body to thereby decrease a downforce acting on the second vehicle body end, to deploy the aerodynamic-element body into a position in the ambient airflow to thereby increase the downforce acting on the second vehicle body end, and to maintain the orientation of the light-reflecting feature to reflect the at least one beam of light along the longitudinal axis between and including the position of the aerodynamic-element body proximate the vehicle body and the position of the aerodynamic-element body deployed into the ambient airflow.

9. The lighting system according to claim 8, wherein the light-reflecting feature is one of a polymer and a glass reflector mounted to the aerodynamic-element body.

10. The lighting system according to claim 8, wherein the light-reflecting feature is a reflective coating applied to the aerodynamic-element body.

11. The lighting system according to claim 8, wherein the light source is an assembly having a lens defined by an external shape configured to diminish accumulation of fluid and grime.

12. The lighting system according to claim 8, wherein the light source includes at least one of a light emitting diode (LED) and a light string.

13. The lighting system according to claim 8, wherein the light source extends over each of a vertical surface and a horizontal surface of the vehicle body, and is thereby arranged partially in a plane perpendicular to the longitudinal axis and partially in a plane parallel to the longitudinal axis facing the light-reflecting feature.

14. The lighting system according to claim 11, wherein the lens includes a hydrophobic coating configured to further diminish accumulation of fluid and grime.

* * * * *